June 10, 1941.          J. F. LEDBETTER          2,244,713
                           DETECTOR
                     Filed Aug. 23, 1939
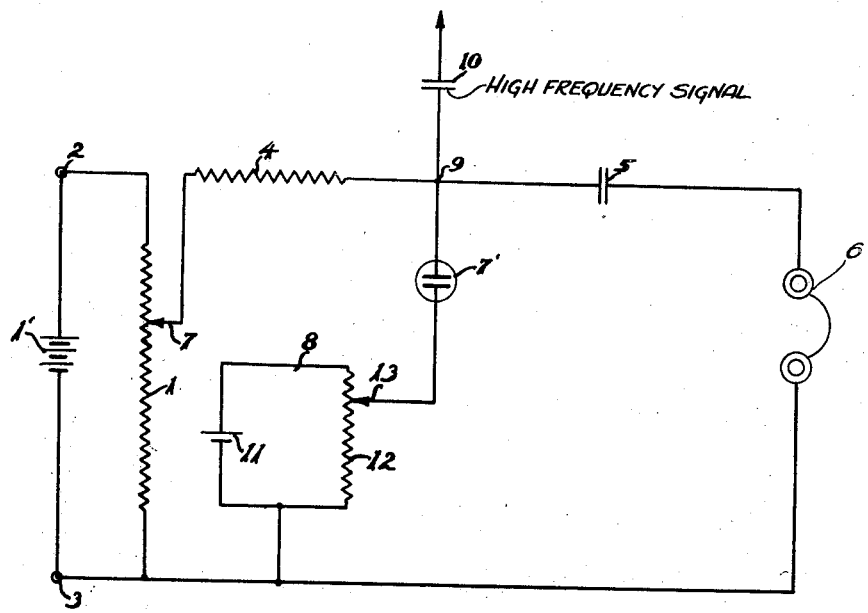
INVENTOR
JOHN F. LEDBETTER
BY W. Glenn Jones
ATTORNEY Patented June 10, 1941

2,244,713

UNITED STATES PATENT OFFICE 2,244,713

DETECTOR

John F. Ledbetter, United States Navy

Application August 23, 1939, Serial No. 291,568

1 Claim. (Cl. 250—27)

(Granted under the act of March 3, 1883, as amended April 30, 1928; 370 O. G. 757)

My invention relates generally to relaxation oscillators and particularly to relaxation oscillator circuits capable of being set into oscillation by the application of an oscillatory electromotive force to such circuit.

An object of my invention is to provide a relaxation oscillator circuit, the voltages of which may be adjusted to a point just short of oscillation, such that when an electromotive force oscillating at a high frequency is applied to a portion of the circuit, relaxation oscillations occur.

Another object of my invention is to provide a device suitable for monitoring or detecting radio frequency signals.

Another object of my invention is to provide an adjustable relaxation oscillator circuit in which relaxation oscillations occur only when an external electromotive force is applied to a portion of the circuit.

A further object of my invention is to provide an adjustable relaxation oscillator circuit adaptable for use in connection with radio control devices.

My invention will be explained in connection with the accompanying drawing which is an electrical schematic showing a preferred form of my invention.

Referring to the drawing, a potentiometer 1 is connected across the positive terminal 2 and the negative terminal 3 of a direct potential charging source 1'. A charging resistance 4, a capacitor 5, and a load impedance 6 are all connected in series between the movable arm 7 of the potentiometer 1 and the negative terminal 3 of direct potential source 1'. A parallel circuit comprising a gas discharge bulb 7' and an adjustable potential bucking circuit 8 in series, is connected between the common junction 9 of resistance 4 and capacitor 5, and the negative terminal 3 of the charging source. Provision is made to connect an external source of oscillatory electromotive force to junction 9 through capacitor 10.

Adjustable potential bucking circuit 8 comprises a direct potential source 11 and a potentiometer 12, with potentiometer 12 connected across source 11. The movable arm 13 of potentiometer 12 connects to gas discharge bulb 7'. The negative terminal of the direct potential source 11 connects to the terminal 3 of the charging source. Direct potential sources 1' and 11 are shown as batteries, but other reasonably harmonic-free direct potential sources would be satisfactory, such as the well-filtered output of a direct potential generator or rectified alternating current power supply. The position of movable arm 7 of potentiometer 1 may be varied to change the charging potential as desired.

In operation, with no oscillatory electromotive force applied to capacitor 10 and with movable arm 13 moved to the negative end of potentiometer 12, the circuit operates in the manner of a conventional relaxation oscillator. Capacitor 5 is charged from direct potential charging source 1' through a charging circuit comprising potentiometer 1, charging resistance 4, load impedance 6 and the capacitor itself. When the potential across capacitor 5 reaches the break-down potential of the gas discharge bulb 7', the gas discharge bulb flashes over and becomes conductive, and capacitor 5 is quickly discharged through a circuit including load impedance 6, the movable arm 13 of potentiometer 12, gas discharge bulb 7' and the capacitor. When capacitor 5 becomes discharged, bulb 7' again becomes non-conductive, capacitor 5 is again charged from the direct potential charging source through the aforementioned charging circuit and the cycle is repeated.

Now, if the movable arm 13 be moved toward the positive end of potentiometer 12, a point will be reached when the bucking potential between arm 13 and the negative terminal 3 of the charging source will be sufficient to prevent the above relaxation oscillations from occurring. This bucking potential is applied across the plates of gas discharge bulb 7' in opposition to the break-down voltage and serves to reduce the effective break-down voltage below the flash-over voltage of the bulb. Now, if an oscillatory high frequency voltage be applied to junction 9 through capacitor 10, the circuit will again break into oscillation due to the positive half of this oscillatory voltage adding to the effective voltage across the bulb, and relaxation oscillations will occur as before at a frequency depending on the constants of the charge and discharge circuits shown. These relaxation oscillations will continue as long as the external oscillatory voltage is applied to junction 9 and will cease when the external voltage is removed.

Load impedance 6 may be a pair of headphones or it may be an audio frequency coupling device to a succeeding audio frequency amplifier stage (not shown). Capacitor 10 may be fixed or variable and should be of such value as not to offer too great an impedance to the external applied oscillatory voltage.

Satisfactory values for the constants of the oscillatory circuits have been found to be as follows: For the direct potential charging source 1', 120 volts, with a voltage of 90 between movable arm 7 and the negative terminal 3 of the charging source. Charging resistance 4 may be 1 megohm; capacitor 5, .0027 microfarad; impedance 6, a pair of head phones of impedance equal to 600 ohms at 1000 cycles; source 11, 6 volts and potentiometer 12, 15,000 ohms. Gas discharge bulb 7' is neon filled and has a relatively low break-down voltage. These constants are such as to produce relaxation oscillations of an audio frequency. With potentiometer 12 adjusted for a non-oscillatory condition, a radio frequency voltage of 2970 kilocycles applied to capacitor 10 readily sets the circuit into oscillation at an audio frequency, the tone of which is audible in the head phones.

A transformer or other suitable coupling device can be utilized as load impedance 6 and the relaxation oscillations thus occurring may be coupled to another circuit and there may be amplified or otherwise utilized as may be desired.

One application of my invention is in connection with a radio controlled vehicle, boat or aircraft in which received and amplified radio frequency energy sets the circuit into oscillation and the relaxation oscillations, sometimes amplified, are employed to operate a relay which actuates the rudder, or speed control mechanism of the radio controlled device.

According to the provisions of the patent statutes, I have set forth the principle and mode of operation of my invention and have illustrated and described what I now consider to represent its best embodiment. However, I desire to have it understood that within the scope of the appended claim the invention may be practiced otherwise than as specifically illustrated and described.

The invention herein described and claimed may be used and/or manufactured by or for the Government of the United States of America for governmental purposes without the payment of any royalties thereon or therefor.

I claim:

A detector for radio frequency potentials, comprising a circuit including an adjustable source of direct potential, a discharge device connected across said source, a capacitance and a sound reproducing device connected in series across said source, said sound reproducing device being responsive to electrical audio frequency oscillations for producing audible sounds, said source, said discharge device, said capacitance and said sound reproducing device having such values that said circuit produces relaxation oscillations at an audio frequency, means for reducing the potential of said source just below the point of oscillation of said circuit, and means for applying an unrectified radio frequency potential to said circuit, whereby with the application of said radio frequency potential said circuit produces oscillations at an audio frequency, said sound reproducing device producing audible sounds.

JOHN F. LEDBETTER.